Nov. 6, 1951     J. W. OFFUTT     2,573,869
FLOAT ROD ASSEMBLY
Filed April 28, 1949
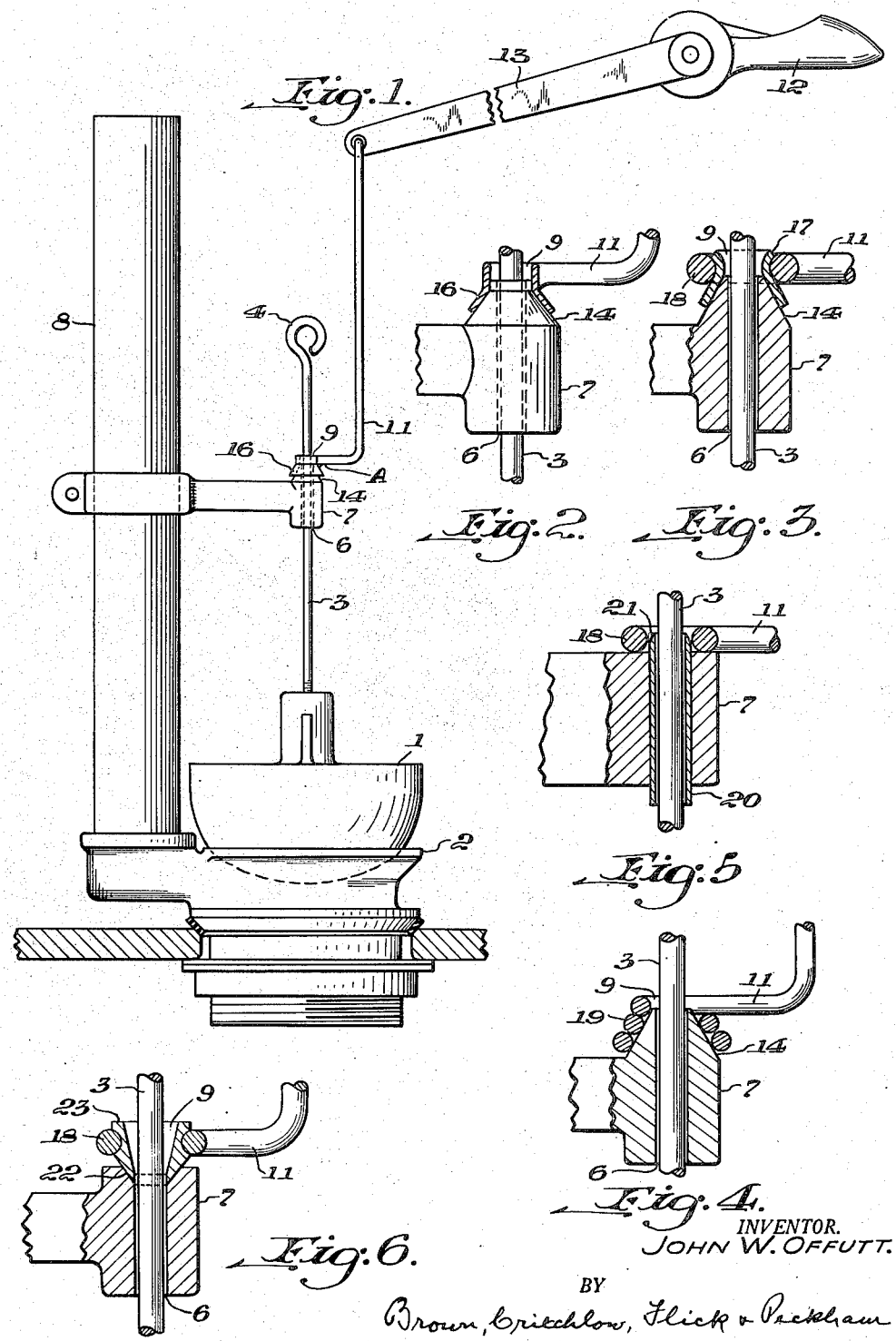
INVENTOR.
JOHN W. OFFUTT.
BY
Brown, Critchlow, Flick & Peckham
his ATTORNEYS.

Patented Nov. 6, 1951

2,573,869

UNITED STATES PATENT OFFICE 2,573,869

FLOAT ROD ASSEMBLY

John W. Offutt, Ellwood City, Pa.

Application April 28, 1949, Serial No. 90,090

9 Claims. (Cl. 4—57)

1

This invention relates to a float rod assembly and, more particularly, to means for preventing binding of the float rod by associated parts of the assembly.

In the usual float rod assembly that is associated with flush toilets, the float rod has attached to its lower end a float valve; and its upper end is formed into a loop to engage a lifting member, which slidably receives the float rod below the loop. To hold the rod in a vertical position, it extends through a hole in a support member positioned below the lifting member. When the float valve is opened by raising the lifting member, the float valve and rod remain in their raised positions until the water has drained from the tank; but the lifting member, in the meanwhile, returns to its normal lowered position, where it rests on the support member. In this position, the lifting member frequently exerts a side thrust against the float rod that binds the rod and prevents the float valve from returning to its closed position when it should. It is common knowledge that this binding action can be a source of great annoyance; it is also a cause of waste of water when failure of the float valve to close is undetected.

It is among the objects of this invention to eliminate such binding action on the float rod by associated parts of the float rod assembly by means that are simple and economical to manufacture and positive in their operation.

In accordance with this invention, the opposed faces of the lifting member and the support member that are normally in contact with each other are provided with mutually engaging surfaces, at least one of which is beveled, so that when the lifting member is lowered into contact with the support member, it will be centered thereon and cannot be laterally displaced in any direction to bind the float rod that extends through both members. In one form of the invention, these mutually engaging surfaces are in the form of a beveled annular boss on one member and a beveled annular seat on the other member, the beveled surfaces of both the boss and the seat being substantially concentric with the hole through the respective member that receives the float rod.

The invention is illustrated in the attached drawings, in which Fig. 1 is an elevation of the complete float rod assembly; Fig. 2 an enlarged detail, partly in section, of the engaging surfaces of the support and lifting members shown in Fig. 1; and Figs. 3, 4, 5, and 6, similar details of modified forms of those surfaces.

Referring to Fig. 1, a float rod assembly of the type generally associated with the tank of a flush toilet includes a float valve 1 resting on a valve seat 2. Attached to the float valve is a float rod 3, the upper end of which terminates in a loop 4.

2

The rod extends through a hole 6 in a support member 7, which is fastened to an overflow pipe 8. The float rod also extends through a hole 9 in a lifting member 11, which normally rests on top of the support member. When the lifting member is raised by the movement of a handle 12 and a connecting lever 13, it slides up the rod until it engages the loop 4 at the upper end of the rod and then raises the rod and the attached float valve. The rod and valve remain in this raised position until the water within the tank has drained out, but the lifting member returns by gravity to its normal lowered position on top of the support member as soon as the handle 12 is released.

In conventional float rod assemblies, when the lifting member is in this lowered position it tends to be laterally displaced by reason of its bent shape and its weight, augmented by the weight of the lever 13. Those same factors also tend to rotate the lifting member about a horizontal axis through the point A. Either or both of those tendencies frequently result in a binding action on the float rod that prevents its attached float valve from returning to its normal closed position when the tank is drained of water. The present invention eliminates any possibility of such binding action by providing mutually engaging surfaces on the opposed contacting portions of the lifting and support members. Those surfaces may take the form shown in Figs. 1 and 2, in which the support member 7 has its upper end formed in the shape of a beveled annular boss 14, shaped like the frustum of a cone, that is concentric with the hole through that member; and the lifting member 11 is provided with a beveled annular seat 16, likewise cone-shaped, which is integral with that member and likewise concentric with the hole through it. This seat 16 may conveniently be formed by flattening in a suitable die the usual loop at the lower end of the lifting member 11. When the lifting member descends to its lowered position, these beveled surfaces come into engagement and positively guide the lifting member 11 into its proper position on the support member 7, so that the holes through each member are in exact alignment. After the lifting member is fully seated on the support member, it cannot be laterally displaced by the forces previously mentioned, nor otherwise bind the float rod 3. As clearly shown in Figs. 2 to 5, inclusive, the hole 9 through the lifting member may be of the larger diameter than the hole 6 in the support member, so that the lifting member when seated on the support member does not even touch the float rod at any point. The latter remains free to slide down into its lowered position when the float valve is no longer buoyed up by water in the tank.

In the embodiment shown in Fig. 3, the seat on the lifting member is not an integral part thereof, but consists of a separate annular element 17, substantially in the form of two hollow frustums of cones joined at their narrower ends, held within the usual loop 18 at the end of the lifting member. In another variation shown in Fig. 4, the end of the lifting member is wound in a spiral of increasing radius to form a seat 19 with a beveled surface that is substantially concentric with the hole for passage of the float rod 10. In each of these modifications, the effective engaging surface on the lifting member is the same or substantially the same as that shown in Figs. 1 and 2 and functions in exactly the same way to prevent binding of the float rod.

A further modification of the specific form of the engaging surfaces in the lifting and support members is shown in Fig. 5. Here, a support member 7 is provided with a sleeve 20 for receiving the float rod 3. The upper end of the sleeve projects above the upper end of the support member and has a beveled edge 21. The toric surface of the ordinary loop 18 at the end of the lifting member provides a beveled seat engaging the outside of the sleeve. The extent of this beveled toric surface, and thereby its effectiveness as a guide for the lifting member 11, may be increased by enlarging the diameter of the material at the end of the lifting member.

In Fig. 6, the seat is part of the support member 7, in the form of a beveled counterbore 22 therein; and the boss is part of the lifting member, in the form of a beveled annular element 23 held within the loop 18 of that member. This is obviously a mere reversal in position of the beveled surface elements shown in the preceding figures. The hole through element 23 for receiving the float rod 3 is preferably tapered, as shown in Fig. 6, with its greatest diameter at its upper end. This construction prevents the upper end of that element from binding the rod if, for any reason, the element rocks slightly in its seat 22.

It is an advantage of this invention that it effectively and positively avoids binding of the float rod in a float rod assembly by preventing lateral displacement in any direction of the lifting member in its lowered position and that the means to accomplish this result can be made and incorporated in the usual assembly with only slight, if any, additional expense.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. In a float rod assembly that includes a vertically reciprocating float rod having its lower end attached to a float valve, the combination with said rod of a support member having a hole therethrough for slidably receiving the rod, and a lifting member having a hole therethrough for slidably receiving the portion of the rod extending above the support member, one of said members having an annular boss concentric with the hole therethrough and the other of said members having an annular seat concentric with the hole therethrough, said boss and seat presenting opposed complementary frustro-conical surfaces adapted to engage each other when the lifting member is in its normal lowered position, so as to prevent lateral displacement of the lifting member in any direction when it is in its normal position and thereby prevent binding of the float rod.

2. A combination according to claim 1, in which the boss is on the support member and the seat is on the lifting member.

3. A combination according to claim 1, in which the boss is on the lifting member and the seat is on the support member.

4. A combination according to claim 1, in which the seat is on the lifting member and consists of rod material wound in a spiral of increasing radius.

5. A combination according to claim 1, in which the boss is on the lifting member and consists of an inverted frustum of a cone, the hole therethrough for receiving the float rod being tapered with its greatest diameter at its upper end, and in which the seat is on the support member in the form of a complementary tapered counterbore therein.

6. A combination according to claim 1, in which said hole through the lifting member is of larger diameter than said hole through the support member, whereby the lifting member in its normal lowered position does not touch the float rod at any point to cause binding of the float rod.

7. In a float rod assembly that includes a vertically reciprocating float rod having a float valve attached to its lower end, the combination of a rigid support member having a hole therethrough for slidably receiving the rod, and a shiftable lifting member having a hole therethrough for slidably receiving the portion of the rod extending above the support member, one of said members having rigidly mounted thereon a vertically projecting annular boss concentric with the hole therethrough, and the other of said members having an opposed complementary vertically tapered annular seat concentric with the hole therethrough for receiving and encircling the boss on the other member only when the lifting member is in its normal lowered position resting on the support member, thereby to prevent lateral displacement of the lifting member in its normal lowered position.

8. Apparatus according to claim 7, in which the boss is a cylindrical sleeve projecting above the support member and the seat is the vertically tapered toric surface of an annular loop of round rod material forming part of the lifting member.

9. Apparatus according to claim 8, in which said cylindrical sleeve has its outer projecting surface tapered vertically upwardly and inwardly, to guide the loop on the lifting member to its normal rest position on top of the support member encircling said sleeve.

JOHN W. OFFUTT.

REFERENCES CITED

The following references are of record in the file of this patent:

UNITED STATES PATENTS

| Number | Name | Date |
| --- | --- | --- |
| 944,098 | Mahurin | Dec. 21, 1909 |
| 976,870 | Guyton | Nov. 29, 1910 |
| 1,145,635 | Vader | July 6, 1915 |
| 1,990,207 | Ruff | Feb. 5, 1935 |
| 2,502,086 | Gertz | Mar. 28, 1950 |